United States Patent
Aktas et al.

(10) Patent No.: US 10,740,462 B2
(45) Date of Patent: Aug. 11, 2020

(54) INSTRUCTION AND/OR DATA VERIFICATION BEFORE EXECUTION

(71) Applicant: Intel Corporation, Santa Clara, CA (US)

(72) Inventors: Erdem Aktas, Beaverton, OR (US); Ravi L. Sahita, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 15/721,144

(22) Filed: Sep. 29, 2017

(65) Prior Publication Data
US 2019/0102547 A1    Apr. 4, 2019

(51) Int. Cl.
*G06F 21/56* (2013.01)
*G06F 21/12* (2013.01)
*G06F 21/64* (2013.01)

(52) U.S. Cl.
CPC ............ *G06F 21/56* (2013.01); *G06F 21/121* (2013.01); *G06F 21/64* (2013.01); *G06F 2221/033* (2013.01); *G06F 2221/0737* (2013.01)

(58) Field of Classification Search
CPC .............................. G06F 21/64; G06F 21/121
USPC ............................................................. 726/23
See application file for complete search history.

(56) References Cited

U.S. PATENT DOCUMENTS

| | | | | |
|---|---|---|---|---|
| 6,952,776 B1* | 10/2005 | Chess | ................... | G06F 21/564 707/999.103 |
| 8,515,075 B1* | 8/2013 | Saraf | ..................... | G06F 21/566 380/277 |
| 2013/0067202 A1* | 3/2013 | Henry | ................. | G06F 9/30076 712/220 |
| 2013/0117531 A1* | 5/2013 | Grochowski | ....... | G06F 12/1027 711/207 |
| 2015/0067856 A1* | 3/2015 | Hearnden | ............ | H04L 63/145 726/23 |

* cited by examiner

*Primary Examiner* — Teshome Hailu
(74) *Attorney, Agent, or Firm* — Schwabe, Williamson & Wyatt, P.C.

(57) ABSTRACT

The present disclosure describes a number of embodiments related to devices, systems, and methods directed to a verification manager to receive an indicator of a memory page having instructions to be executed by the one or more processors, determine whether the indicator indicates the memory page has been updated, verify integrity of the instructions, in response to a result of the determination indicating the memory page has been updated, and allow or disallow execution of the instructions, based at least in part on a result of the integrity verification.

23 Claims, 6 Drawing Sheets

Non-transitory computer-readable storage medium 602, as may be implemented in embodiments of FIG. 5.

Programming instructions 604
to cause a digital content consumption device, in response to execution of the instructions by a processor of the digital content consumption device, to practice aspects of embodiments of the processes of FIGs. 2-4.

FIG. 6

INSTRUCTION AND/OR DATA VERIFICATION BEFORE EXECUTION

FIELD

Embodiments of the present disclosure generally relate to the fields of computing systems and computing security. More specifically, embodiments may relate to verifying integrity of instructions prior to their execution and/or verifying data prior to their usage.

BACKGROUND

The last several years have seen a dramatic increase in the number of computer systems and servers. Along with this increase have been an increased number of viruses and/or other malware targeting these systems and servers. Frequently, these viruses and/or malware attempt to infiltrate memory that contains data or instructions to be executed and to alter those data or instructions to execute an authorized code and to compromise security.

Malware and viruses typically target the weakest chain in a technology or directly target the users to convince them to execute the malicious code through e.g., phishing attacks. Although millions of new malware may be found daily, the malware largely belong to finite and small number of families (few thousand where few tens of them are mainly active). Each malware family may use one or many techniques to create new samples which may be totally different than the original binary. Malware can use packing, encryption, polymorphism, obfuscation, etc. technologies to create new samples of the same malware.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 6 is a diagram illustrating computer readable media having instructions for practicing verification technology, in accordance with various embodiments.

DETAILED DESCRIPTION

Figure 1:
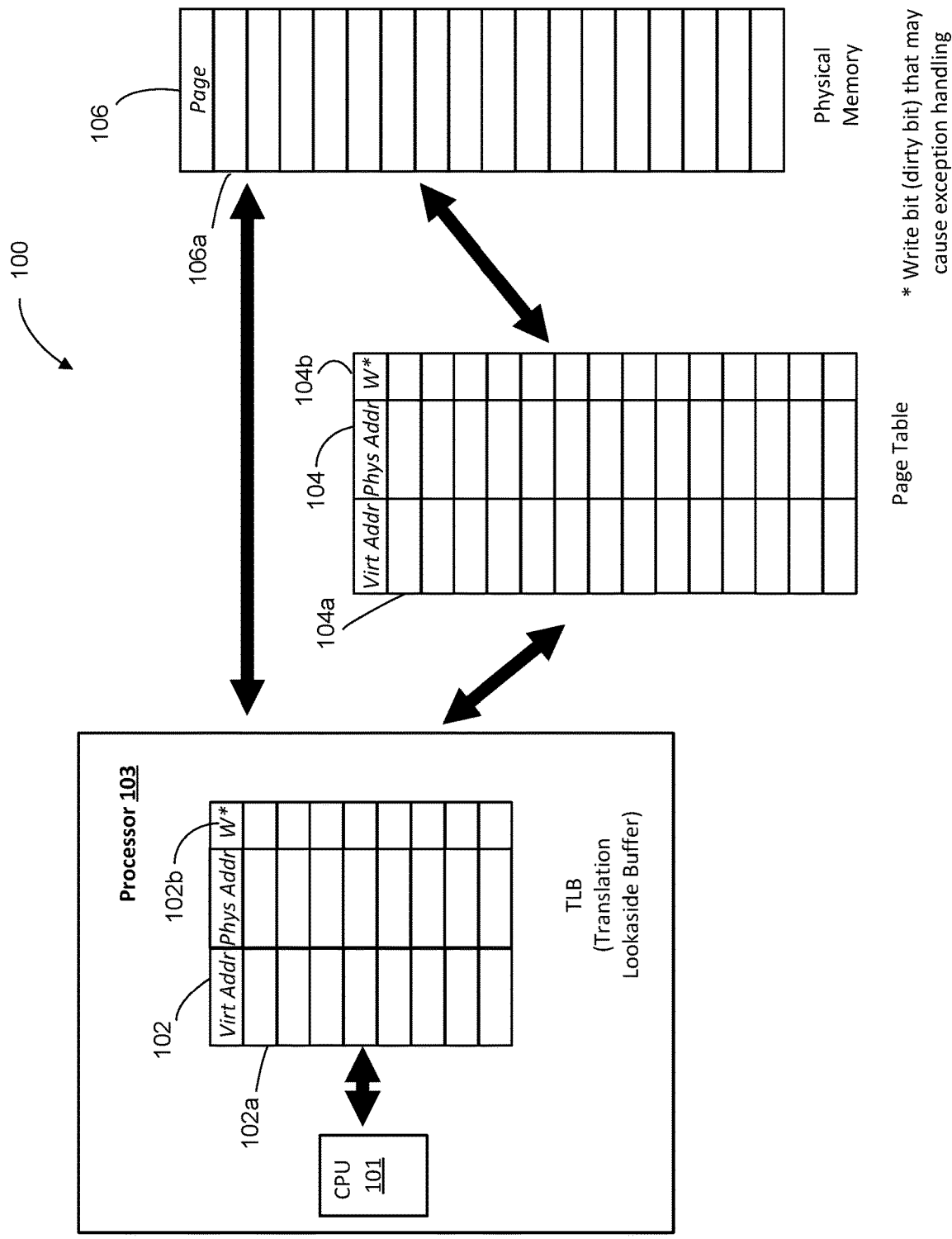
FIG. 1 is a diagram illustrating the interaction of a translation lookaside buffer (TLB) and a page table for verification of content of memory pages prior to instructions execution and/or data usage, in accordance with various embodiments.

Methods, apparatuses, and systems are disclosed herein that may be directed to verifying the integrity of a memory page that may include data or executable instructions that may have been altered by malware and, if so, verifying the page. For example, one or more instructions to be executed by a central processing unit (CPU) may be loaded from a memory page using a page table. If that memory page has been changed (e.g. the memory page is marked "dirty" or has its write bit set), an exception may result (e.g. a # DX (DirtyExecute) exception) and an exception handler process may be invoked to verify the contents of the memory page. In embodiments, no instruction from the memory page may execute until the verification process either identifies that the memory page is valid, or repairs the invalid memory page. The write bit, or some other indicator associated with the memory page, may then be cleared.

The exception handler, which may also be referred to as a verification manager, may be an anti-virus program or some other program that may register with the operating system and execute to verify the memory page and/or restore the memory page. Once the memory page is verified (with restore, if necessary), execution, for example, of the instructions in the memory page may continue.

In embodiments, the process described above may be used in a similar fashion to protect virtual function pointers, handles and/or other critical data structures that could be used by malware to alter the control flow of the execution. In embodiments, operating system or application specific handlers (e.g. antivirus processes) may be registered to be notified when any instruction pointer is read from a page that has a write bit set (or otherwise causes an exception that requires handling). The verification process may incorporate machine-learning (ML) techniques to verify dirty pages, for example without using any signatures. This way, an antivirus process may use a small set of signature or heuristic rules, or utilize the ML system to detect malware more effectively on computing systems and to correct affected memory pages, if possible.

In embodiments, this technology may be used to continuously verify the integrity of any trusted system. For example, on every exception handling (e.g. handling a # DX exception), the system integrity can be measured and verified again for continued attestation. There may be multiple attestation algorithms, for example one may be to calculate the check sum of the binary image in the memory and validate the check sum by comparing it to a third party or customer verified white list. In legacy implementations, this is done only at the binary image load. However, in embodiments, the exception handling allows a timing for the memory scan to allow the malicious code to be caught in time before execution.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

Various operations are described as multiple discrete operations in turn, in a manner that is most helpful in understanding the claimed subject matter. However, the order of description should not be construed as to imply that these operations are necessarily order dependent.

FIG. 1 is a diagram illustrating the interaction of a TLB and a page table for verifying content of memory pages prior to instructions execution and/or data usage, in accordance with various embodiments. Diagram 100 may show a TLB 102 of a processor 103 that may store multiple cached recent virtual address to physical address translations 102a of memory pages 106a in a physical memory 106. In embodiments, the cached virtual address to physical address translations 102a may include a subset of recently used/accessed virtual address to physical address translations from page table 104. In embodiments, the TLB 102 may be used by a CPU 101 of processor 103 to provide quick access to virtual address to physical address translations to memory pages 106a in memory 106 that may include instructions to be executed, and/or data to be used.

The page table 104 may store multiple virtual address to physical address translations 104a, which may be accessed if the desired virtual address to physical address translation does not exist in the TLB 102. If the page table 104 is accessed, a page walk may commence to determine the virtual address to physical address translation in the page table 104 to be used, and cached in TLB 102.

Once a virtual address to physical address translation entry 102a, 104a of a memory page 106 is located, in embodiments, the write bit 102b, 104b (which may also be referred to as a dirty bit) associated with that memory page may be examined. In embodiments, the write bit 102b, 104b may be referred to as a write indicator or a dirty bit.

Figure 5:
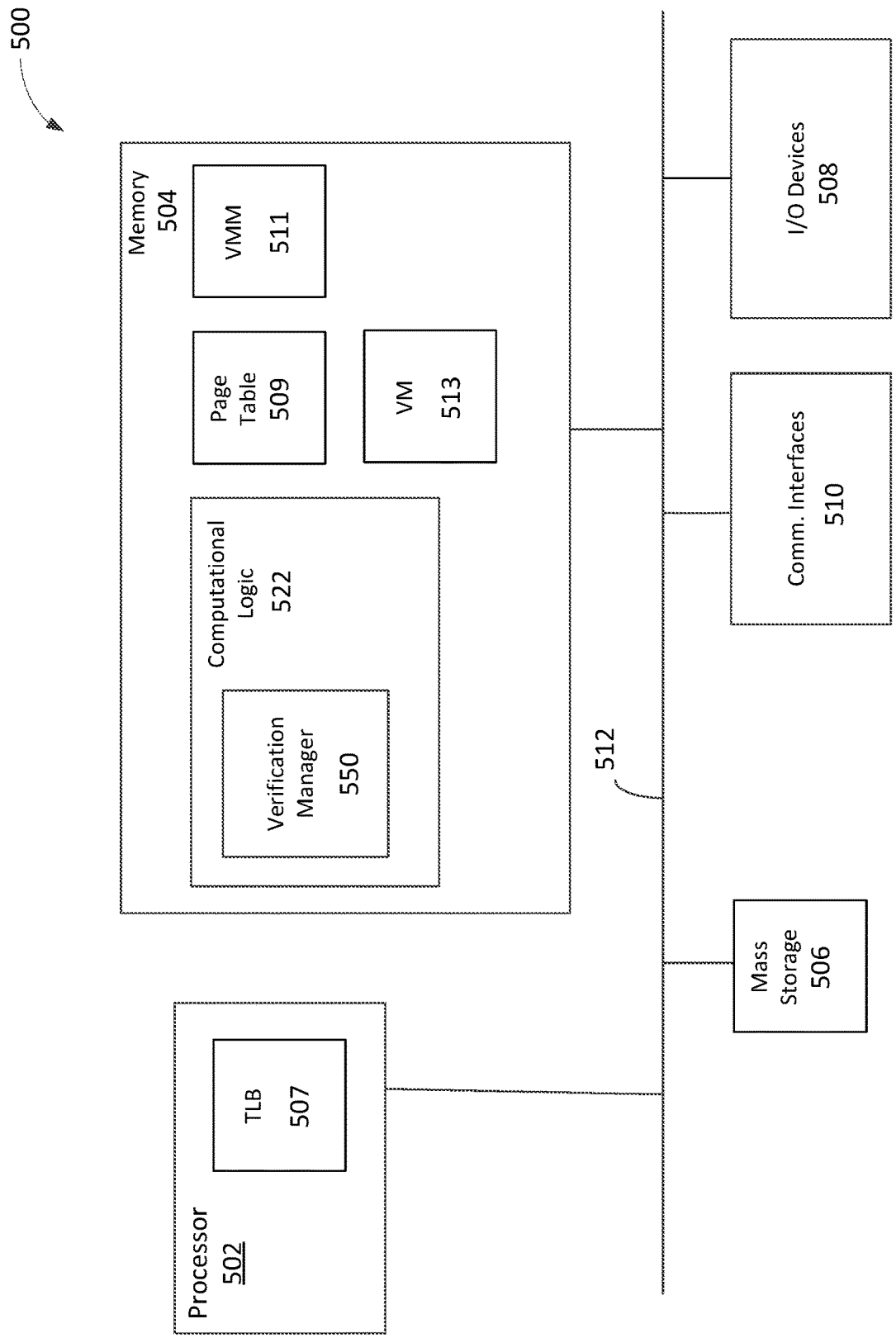
FIG. 5 illustrates an example computing device suitable for use to practice aspects of the present disclosure, in accordance with various embodiments.

In embodiments, the write bit 102b, 104b may be set by a virtual machine manager (VMM) 511 of FIG. 5 or by a hypervisor (not shown) in response to a write to physical memory 106 by an operating system or an application. However, the write bit 102b, 104b may be set as a result of a virus or other malware having made an attempt to alter the instructions stored in physical memory page (e.g. a "code injection") to redirect execution so that malware code is executed. By treating all physical memory pages 106a referenced by TLB 102 or page table 104 virtual address to physical address translations that have a write bit 102b, 104b set as requiring validation, the CPU 101 may always have valid (i.e. non-malware) code to execute and/or valid data to use.

In embodiments, the first time that program instructions may be loaded into memory, e.g., by the operating system loader (not shown) or linker (not shown) components of a VM (e.g., VM 513 of FIG. 5), all write bits 102b, 104b for committed physical memory pages 106a may be cleared. When memory was first loaded with instructions or data, or subsequently re-loaded with the write bit cleared, this may be referred to as a "last checked" state of the memory. Committed memory pages may include the memory pages that are touched. When a loader/linker may load the binary into memory, a real memory may be assigned and reserved for the virtual address assigned for the loading process. When a binary image is loaded, the memory pages may be accessed with write permission (loaded to the DTLB) and the dirty bit in the page tables may be set. Once loading is completed, the dirty bits may be cleared and the DTLB may be flushed before the loader executes the binary. Therefore, the operating system may not trigger an exception unless the code in those memory pages referenced in physical memory was altered, for example by malware, after the initial load.

Instructions in binary files that may be partially identified by a virtual address to a physical address translation 102a, 104a to physical memory 106a to be executed by the CPU 101, may be in three types. The first type may be static binaries, which may make up most binaries that contain instructions. Once these binaries are loaded in to physical memory 106, and all write bits 102b, 104b may be cleared, there should be no change in the executable code pages unless there is a code injection from a malware or virus. For these binary files, there may be no performance overhead accessing the page table 104 unless there is an unauthorized code injection.

The second type of binary files that contain instructions may include runtime code injection or generation. This may include hot patch installers, installers, packers, decryptors, protectors, and/or similar applications. When these files execute and write to physical memory to update instructions in memory at a page 106a, the corresponding write bit 102b, 104b may be set. Subsequently, when that page is retrieved from memory and the write bit 102b, 104b is identified, an exception will be created and the page verified. However, the anti-malware, security agent, or antivirus solutions that may provide the validation may be trained to quickly identify and verify the integrity of these instructions newly written to memory.

The third type of binary files the contain instructions that include self-modifying code and/or just-in-time (JIT) execution. Although this third type of binary files may be similar to the second type of binary files described above, it may be more difficult for the anti-malware, security agent, or anti-virus solutions to quickly validate the memory pages in memory referred to by virtual address to physical address translations 102a, 104a based on, for example, a known signature. For these types of files, there may be a slight increase in overhead over the second type of files to identify and verify the integrity of these instructions.

Figure 3:
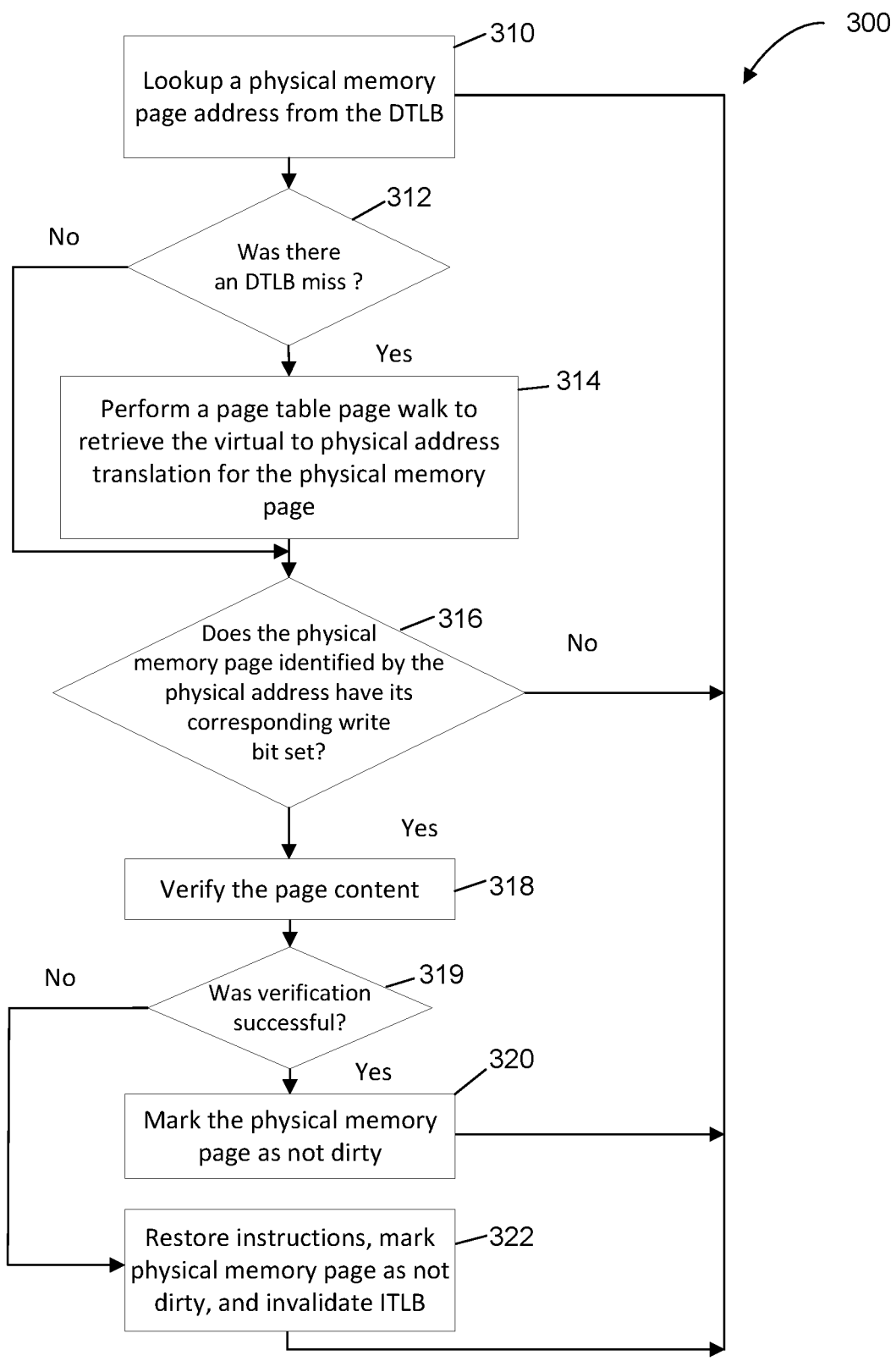
FIG. 3. is a flow diagram that illustrates another verification process for verifying a physical memory page containing data, in accordance with various embodiments.
Figure 4:
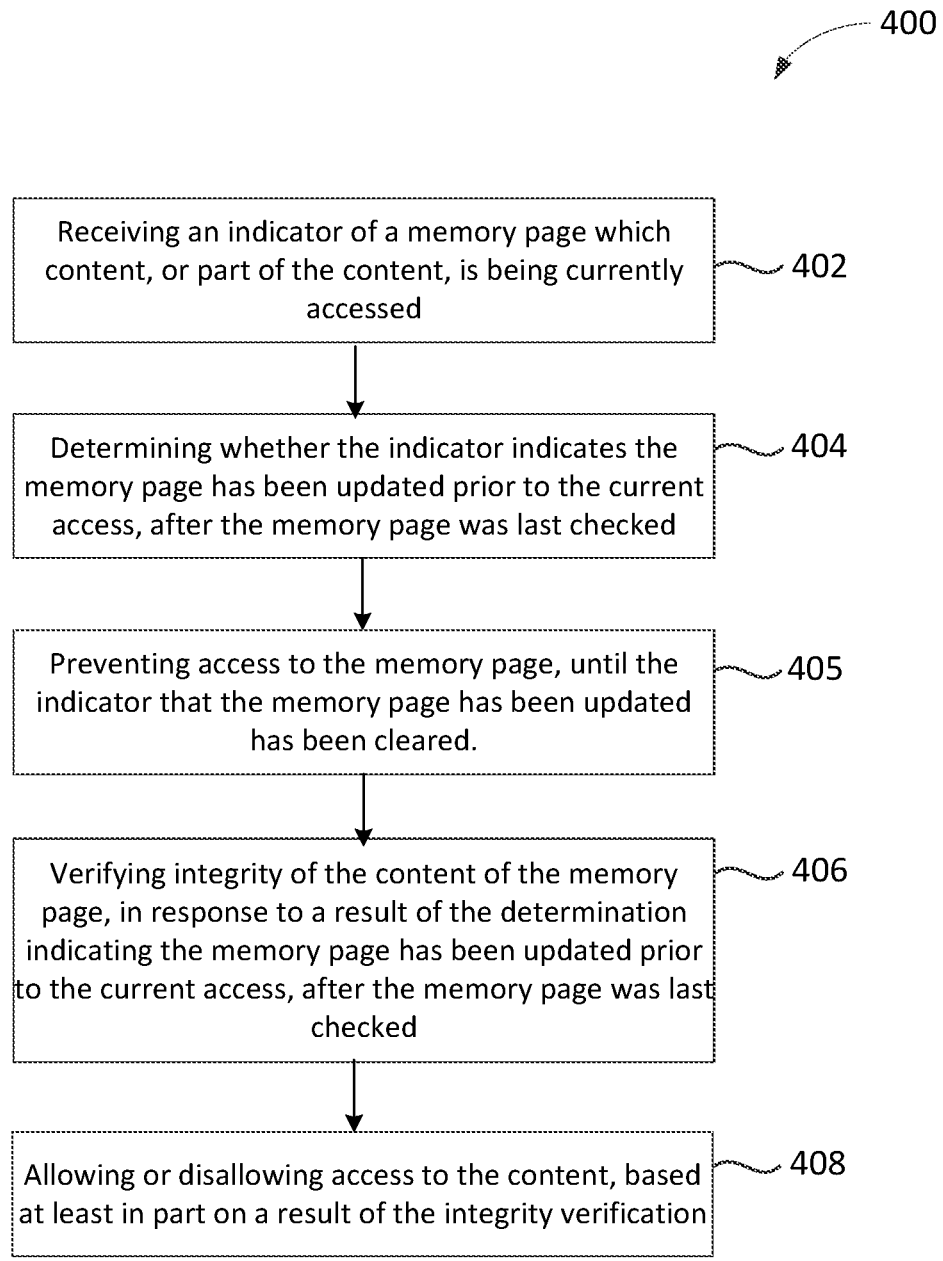
FIG. 4. is a block diagram that illustrates a process for implementing a verification manager for a memory page, in accordance with various embodiments.

Referring now first to FIG. 4, which is a block diagram that illustrates a process for implementing a verification manager for a memory page, in accordance with various embodiments. In embodiments, diagram 400 may illustrate a process that may be implemented using CPU 101, processor 103, TLB 102, page table 104, and/or physical memory 106 of FIG. 1. Diagram 400 may represent a higher-level process flow, as compared to the process flows that may be represented by diagram 200 of FIG. 2 or diagram 300 of FIG. 3.

At block 402, the process may include receiving an indicator of a memory page which content, or part of the content, is being currently accessed. In embodiments, the indicator may be of a physical memory page such as physical memory page 106a of physical memory 106. The indicator of the memory page may have been determined by the presence or absence of an entry in the TLB 102 or page table 104 based upon a request for a new physical memory page at a physical memory page address that corresponds to a virtual memory address that may be requested by the CPU 101 or by a MMU subsystem (not shown).

At block 404, the process may include determining whether the indicator indicates the memory page has been updated prior to the current access, after the memory page was last checked. In embodiments, an indication that the memory page has been updated may be a TLB write bit 102b and/or a page table write bit 104b associated with physical memory page 106a in physical memory 106 that has been set. As described above, when a data write is performed on a memory page located in physical memory, the corresponding write bit 102b, 104b (i.e. dirty bit) may be set to indicate that physical memory has been changed. In embodiments, the memory page may have been last checked during initialization, or may have been checked at the time the write bit 102b, 104b associated with the memory page was cleared. In embodiments, an exception handler may be invoked to report that a memory page 106a that may be indicated as dirty, may be have been accessed or may be currently being accessed for instruction execution. In subsequent blocks, this exception handler may cause security attribute checking code to be invoked. In embodiments, security attribute checking code may include antivirus code, or other verification and/or replacement code restored the memory page 106a to identify errors in and/or to correct contents of the memory page. In embodiments, the exception and there may be executed in privileged software or in privileged hardware mode.

At block 405, the process may include preventing access to the memory page, until the indicator that the memory page has been updated has been cleared. In embodiments, as long as the write bit 102b, 104b associated with the memory page 106a is set, the process will prevent any access, e.g. non-privilege access, to the memory page, which may include reading or writing, until the write bits 102, 104b have been cleared. In this way, if any malicious code has caused the contents of the memory to be modified, the contents of the memory will be isolated until the verification process may be performed At block 406, the process may include verifying integrity of the content of the memory page, in response to a result of the determination indicating the memory page has been updated prior to the current access, after the memory page was last checked. In embodiments, the determination indicating the memory page has been updated may be a write bit 102b, 104b associated with the memory page 106a being set. As a result of the determination, an exception may be generated to cause a verification manager to be executed to verify the integrity of the content of the memory 106a. In embodiments, the verification manager may include all or part of antivirus, anti-malware, or some other similar software to be executed. In embodiments, the verification manager may only verify the integrity of the contents of the memory page 106a. In other embodiments, the verification manager may verify and/or repair and/or restore the memory page 106a to its proper contents.

At block 408, the process may include allowing or disallowing access to the content, based at least in part on a result of the integrity verification. In embodiments, where the process may verify that the memory page 106a is valid and/or may restore the memory page 106a to its proper contents, and the memory page 106a includes executable instructions, the process may allow execution of the instructions by the CPU 101. When the memory page 106a includes data, the process may allow access to the data by the CPU 101. In embodiments, where the page 106a has not been able to be verified and/or not been able to have been repaired, the process may disallow access by the CPU 101 to the memory in the memory page 106a.

Figure 2:
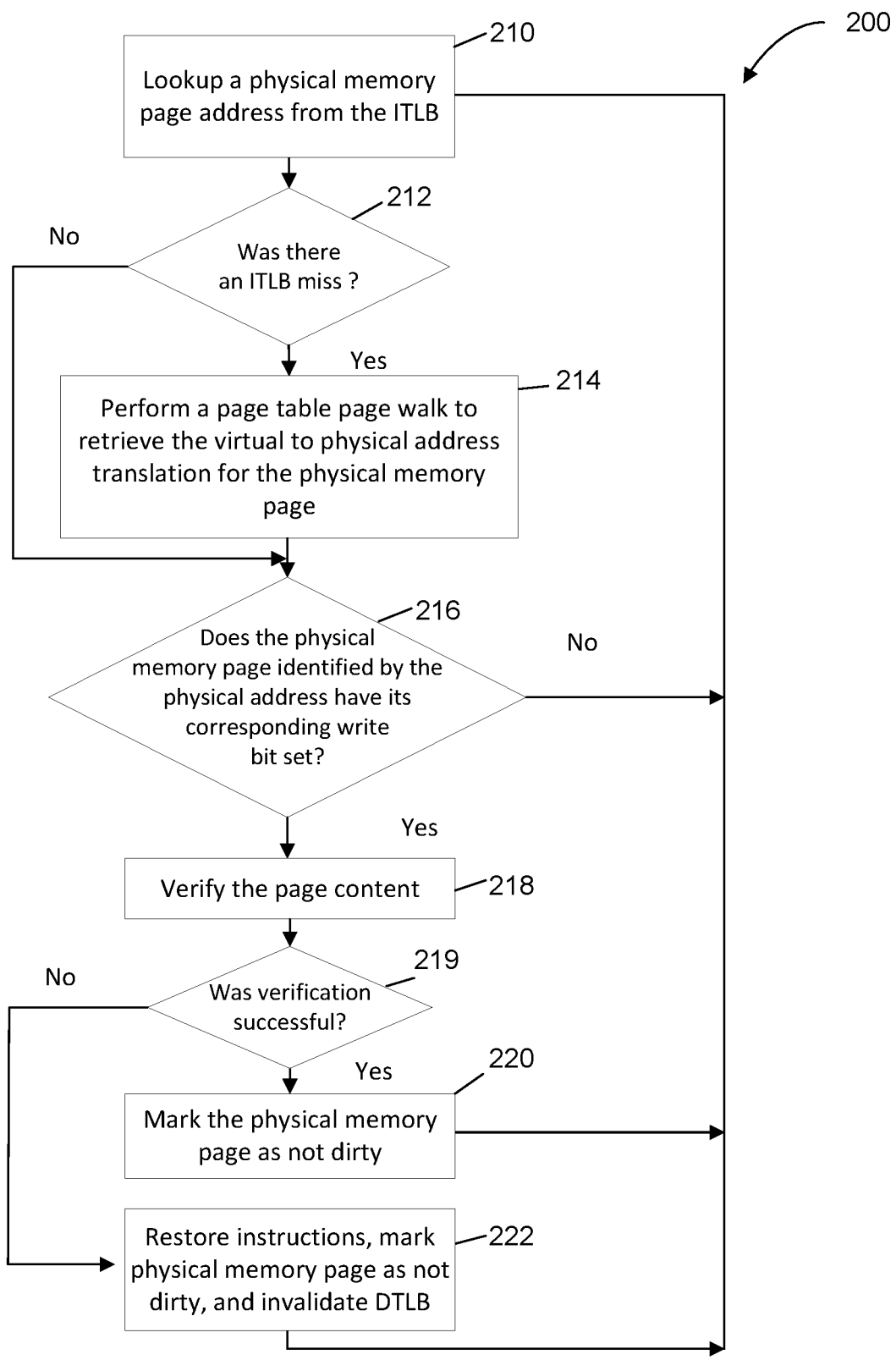
FIG. 2 is a flow diagram that illustrates a process for verifying instructions to be executed, in accordance with various embodiments.

Referring now back to FIG. 2, which is a flow diagram that illustrates a process for verifying instructions to be executed, in accordance with various embodiments. Diagram 200 may illustrate a process that may be performed by an operating system, a VMM 511, and a verification manager (exception handler) using CPU 101, processor 103, TLB 102, page table 104, and/or physical memory 106 of FIG. 1.

At block 210, the process may include looking up a physical memory page address from the instruction TLB (ITLB). In embodiments, the ITLB may be a specialized instance of the TLB 102 that may contain only virtual address to physical address translations of memory containing executable instructions. The operation may be performed e.g., by the VMM 511, in response to an instruction fetch from a memory page by a virtualized instance of an instruction fetch unit of CPU 101 of a virtual machine (VM) 513 managed by the VMM 511.

At block 212, the process may include determining whether there was an ITLB miss. For example, virtual to physical address translation of the memory page the virtualized CPU 101 instruction fetch unit may be trying to fetch may not be in the ITLB (TLB). This may occur if the page has not been previously requested and the virtual address to physical address translations was not stored in the ITLB cache. In embodiments, the miss may be the result of a request to fetch an address mapping from a TLB. If there is no miss (i.e. the address of the memory page in physical memory is found in the ITLB), then the process may go to block 216.

On a determination that there was an ITLB miss, at block 214 the process may perform a page walk to retrieve the virtual to physical address translation for the physical memory page. In embodiments, the page table 104 may be progressively searched to locate the desired virtual address to physical address translation 104a and on locating the virtual address to physical address translation 104a of physical memory page, cache the virtual address to physical address translation 104a of the physical memory page ITLB (TLB 102).

At block 216 a determination may be made whether the memory page identified by the physical memory address has been previously modified prior to the current access (since the last clear/reset), e.g., whether its corresponding write bit 102b, 104b has been set. Having the write bit set may also be referred to as having the dirty bit set or the physical memory page being marked dirty. In embodiments, as discussed above, a memory page 106a may be marked as dirty if it has been previously written to or modified prior to the current access (since the last reset/clear). If the memory page 106a has not been written to and the write bit has not been set, then the process may return to block 210, and continue therefrom as earlier described.

On a determination that that the write bit 102b, 104b of the requested physical memory page 106a is set, at block 218 the process may verify the page content. In embodiments, the presence of a write bit 102b, 104b when the CPU is about to execute instructions on the memory page may cause a verification manager to be run against the contents of the memory page 106a to verify the memory page integrity. In embodiments, the verification manager may be part of the operating system or some other security subsystem. For example, antivirus software or anti-malware software may be executed against the contents of the memory page 106a to determine whether the page has been corrupted through an unauthorized code injection. In other examples, the verification manager may identify the correct contents of the page and then may update the page with the correct contents. In embodiments, the verification manager may operate in the same execution environment as the operating system and applications. In other embodiments, the verification manager may operate in a trusted execution environment separate and secured from the execution environment of the operating system and applications.

At block 219, a determination may be made whether the verification was successful. If yes, the process may proceed to block 220. If no, the process may proceed to block 222.

At block 220, on successful verification, the process may include marking the physical memory page as not dirty. In embodiments this may include clearing the write bit 102b, 104b associated with the physical memory page. Thereafter, the process may return to block 210 and continue therefrom as earlier described.

At block 222, on failure of verification, the process may include restore the instructions of the physical memory page, marking the write bit 102b, 104b, associated with the physical memory page as not dirty, and additionally, invalidating the data TLB (DTLB). In embodiments, the DTLB may contain virtual address to physical address translations for data memory pages only (i.e. no instruction memory pages). The DTLB may be associated with the ITLB. In embodiments, the invalidation may apply to the DTLB for all cores. In embodiments, all DTLB entries with write permission for the indicated memory page such that a subsequent request to write to the memory page will cause a miss response, may be invalidated. This may cause a miss response for the address mapping from the DTLB. In embodiments, this may cause the indicated memory page to be marked as dirty.

The DTLB may be used for data read/write access and the ITLB may be used for fetching instructions. Both ITLB and DTLB may be used to translate the virtual addresses to physical address and for checking access permission. In embodiments, no memory region is to be executed when it is modified at some point without being verified. Therefore, there may not be an entry in ITLB when there may be a DTLB entry with write permission. So, when there is an entry to be added to the DTLB with write permission, all the ITLB entries are to be invalidated. Similarly, when there is an entry to be entered to the ITLB (when the memory is accessed to be executed), the writeable DTLB entries for the same memory region need to be removed. Since each core has its own ITLB and DTLB entries, the invalidation is to happen on all cores. For example, the INVLPG command may be used to cause this invalidation to occur. Thereafter, the process may return to block 210 and continue therefrom as earlier described.

In embodiments, when a write may be attempted to a memory page that has executed permission, a DTLB entry may be created with a dirty bit set. Furthermore, any associated or matched entry in the ITLB may be invalidated to prevent subsequent execution of the memory page. In embodiments, all matching and/or associated ITLB entries for all logical processors or for all cores may be invalidated. In embodiments, all matching DTLB entries may be invalidated for all logical processors and/or cores.

Referring now to FIG. 3, which is a flow diagram that illustrates another verification process for verifying a physical memory page containing data, in accordance with various embodiments. Diagram 300 may illustrate a process that may be performed by an operating system, a VMM, and a verification manager (exception handler), using CPU 101, processor 103, TLB 102, page table 104, and/or physical memory 106 of FIG. 1.

At block 310, the process may include requesting a physical memory page address from a data TLB (DTLB). In embodiments, the DTLB may be a specialized instance of the TLB 102 that may contain only virtual address to physical address translations of physical memory pages containing data. The operation may be performed by a VMM 511 in response to a data fetch by a virtualized instance of the CPU 101 in a virtual machine (VM) 513 of FIG. 5 managed by the VMM 511.

At block 312, the process may include determining whether there was a DTLB miss. For example, the virtualized instance of CPU 101 may be trying to fetch data from a physical memory page where the virtual to physical memory address translation may not be in the DTLB (TLB). This may occur if the physical memory page containing the data has not been recently requested and the virtual address to physical address translations was not stored in the DTLB cache. If there is no miss (i.e. the address of the memory page in physical memory is found), then the process may go to block 316.

On a determination that there was a DTLB miss, at block 314 the process may perform a page walk to retrieve the virtual to physical address translation of the physical memory page. In embodiments, the page table 104 may be progressively searched to locate the desired virtual address to physical address translation 104a and on locating the virtual address to physical address translation 104a of physical memory page, cache the virtual address to physical address translation 104a of the physical memory page in the DTLB.

At block 316 a determination may be made whether the memory page identified by the physical memory address has been previously modified prior to the current access (since the last clear/reset), e.g., whether its corresponding write bit 102*b*, 104*b* has been set. In embodiments, as discussed above, a physical memory page 106*a* may be marked as dirty if it has been written to or modified prior to the current access (since the last reset/clear). If the memory page 106*a* has not been written to and the write bit has not been sent, then the process may return to block 310, and continue therefrom as earlier described.

On a determination that that the write bit 102*b*, 104*b* of physical memory page 106*a* is set, at block 318 the process may verify the page content. In embodiments, the presence of the write bit 102*b*, 104*b* when data from the memory page is being read may cause a verification manager to be run against the contents of the memory page 106*a* to verify the memory page integrity. In embodiments, the verification manager may be part of the operating system or some other security subsystem. For example, antivirus software or anti-malware software may be executed against the contents of the memory page 106*a* to determine whether the page has been corrupted through an unauthorized code injection. In other examples, the verification manager may identify the correct contents of the page and then may update the page with the correct contents.

At block 319, a determination may be made whether the verification was successful. If yes, the process may proceed to block 220. If no, the process may proceed to block 222.

At block 320, on successful verification, the process may include marking the physical memory page as not dirty. In embodiments this may include clearing the write bit 102*b*, 104*b* associated with the physical memory page. Thereafter, the process may return to block 310 and continue therefrom as earlier described.

At block 322, on failure of verification, the process may include restore the data of the physical memory page, mark the physical memory page as not dirty, and additionally, invalidating the ITLB. In embodiments, the ITLB may contain virtual address to physical address translations for instruction memory pages only (i.e. no data memory pages). The ITLB may be associated with the DTLB. In embodiments, the invalidation may apply to the ITLB for all cores. As described above, DTLB may be used for data read/write access and the ITLB may be used for fetching instructions. Both ITLB and DTLB may be used to translate the virtual addresses to physical address and for checking access permission. In embodiments, no memory region is to be executed when it is modified at some point without being verified. Therefore, there may not be an entry in ITLB when there may be a DTLB entry with write permission. So, when there is an entry to be added to the DTLB with write permission, all the ITLB entries are to be invalidated. Similarly, when there is an entry to be entered to the ITLB (when the memory is accessed to be executed), the writeable DTLB entries for the same memory region need to be removed. Since each core has its own ITLB and DTLB entries, the invalidation is to happen on all cores. For example, the INVLPG command may be used to cause this invalidation to occur. Thereafter, the process may return to block 210 and continue therefrom as earlier described.

FIG. 5 illustrates an example computing device suitable for use to practice aspects of the present disclosure, in accordance with various embodiments. The example computing device of diagram 500 may be suitable to practice the functions associated with diagrams 100-400.

As shown, computing device 500 may include one or more processors 502, having one or more cores, which may be similar to CPU 101 of FIG. 1, and system memory 504. The processor 502 may include any type of unicore or multi-core processors. Each processor core may include a central processing unit (CPU), and one or more level of caches. In embodiments, one or more processors 502 may include a hardware accelerator (not shown), which may be programmable circuitry, such as Field Programmable Gate Array (FPGA). The processor 502 may be implemented as an integrated circuit.

Processor 502 may include the TLB 507. The TLB 507, in embodiments, may be part of processor 502 that may store multiple cached recent virtual address to physical address translations (e.g. 102*a* of FIG. 1) of memory pages (e.g. 106*a* of FIG. 1) in a physical memory (e.g. 106 of FIG. 1 or 504 of FIG. 5). The TLB 507 may be similar to TLB 102 of FIG. 1.

The computing device 500 may include mass storage devices 506 (such as diskette, hard drive, volatile memory (e.g., dynamic random access memory (DRAM)), compact disc read only memory (CD-ROM), digital versatile disk (DVD) and so forth). In general, system memory 504 and/or mass storage devices 506 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

Memory 504 may include a plurality of memory pages (e.g. 106*a*) held in physical memory (e.g. 106). Each memory page (e.g. 106*a*) may have an associated write bit (e.g. 104*b*) in the page table 509 that may indicate whether the memory page (e.g. 106*a*) has been written to since it was loaded, for example from a mass storage device 506 such as a disk drive. Memory 504 may include a VMM 511 and the VM 513 managed by the VMM 511. Each VM 513 may include a virtualized instance of a CPU of processor 502 (which may be similar to processor 103), a guest OS and applications. Memory 504 may also include page table 509, which may store multiple cached recent virtual address to physical address translations (e.g. 104*a* of FIG. 1) of memory pages (e.g. 106*a* of FIG. 1) in a physical memory (e.g. 106 of FIG. 1 or 504 of FIG. 5).

The computing device 500 may further include input/output (I/O) devices 508 such as a display, keyboard, cursor control, remote control, gaming controller, image capture device, and communication interfaces 510 (such as network interface cards, modems, infrared receivers, transceivers, radio receivers (e.g., Bluetooth), and so forth). I/O devices 508 may be suitable for communicative connections with other devices.

In embodiments, communication interfaces 510 may include communication chips (not shown) that may be configured to operate the device 500 in accordance with wired or with wireless protocols.

The above-described computing device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices 506 may be employed to store a working copy and a permanent copy of the programming instructions implementing the operations and functionalities associated with the verification manager 550, generally shown as computational logic 522. Computational logic 522 may be implemented by assembler instructions supported by processor(s) 502 or high-level languages that may be compiled into such instructions.

In embodiments, the Computational Logic 522 may contain a verification manager 550, which may perform one or more of the functions associated with diagrams 100-400. In embodiments, the verification manager 550, in whole or in part, may be implemented in hardware, in firmware, or as a field programmable gate array (FPGA).

A permanent copy of the programming instructions may be placed into mass storage devices 506 in the factory, or in the field, though, for example, a distribution medium (not shown), such as a compact disc (CD), or through communication interfaces 510 (from a distribution server (not shown)).

FIG. 6 is a diagram illustrating computer readable media having instructions for practicing the verification technology earlier described, in accordance with various embodiments. Diagram 600 may illustrate computer readable media 602 having instructions for practicing the above-described techniques, or for programming/causing systems and devices to perform the above-described techniques, in response to execution of the instructions by a processor of a computing device in accordance with various embodiments. In some embodiments, such computer readable media 602 may be included in a memory or storage device, which may be transitory or non-transitory, of the computing device 500 of FIG. 5. In embodiments, instructions 604 may include assembler instructions supported by a processing device, or may include instructions in a high-level language, such as C, that can be compiled into object code executable by the processing device. In some embodiments, a persistent copy of the computer readable instructions 604 may be placed into a persistent storage device in the factory or in the field (through, for example, a machine-accessible distribution medium (not shown)). In some embodiments, a persistent copy of the computer readable instructions 604 may be placed into a persistent storage device through a suitable communication pathway (e.g., from a distribution server).

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 may be an apparatus for computing, comprising: one or more processors; a verification manager (VFM) coupled with the one or more processors, wherein the VFM is to: receive an indicator of a memory page which content, or part of the content, is being currently accessed; determine whether the indicator indicates the memory page has been updated prior to the current access, after the memory page was last checked; prevent access to the memory page, until the indicator that the memory page has been updated has been cleared; verify integrity of the content of the memory page, in response to a result of the determination indicating the memory page has been updated prior to the current access, after the memory page was last checked; allow or disallow access to the content, based at least in part on a result of the integrity verification.

Example 2 may include the apparatus of example 1, wherein has been cleared further includes has been cleared by privileged software or hardware.

Example 3 may include the apparatus of example 1, wherein to determine whether the indicator indicates the memory page has been updated prior to the current access further includes to determine whether a dirty bit associated with the memory page has been set.

Example 4 may include the apparatus of example 1, wherein to verify integrity of the content of the memory page further includes to: invoke an exception handler to report that a memory page indicated as dirty was being accessed for instruction execution; confirm that the content of the memory page is valid; or modify the memory page content so that the modified memory page content is valid.

Example 5 may include the apparatus of example 4, wherein to invoke an exception handler further includes to generate a restartable exception to transfer execution control to the exception handler.

Example 6 may include the apparatus of example 5, wherein the exception handler is executed in privileged software or hardware.

Example 7 may include the apparatus of example 4, wherein the exception handler is to execute security attribute checking code to confirm that the memory page content is valid.

Example 8 may include the apparatus of example 7, wherein security attribute checking code includes antivirus code.

Example 9 may include the apparatus of any one of examples 1-8, wherein to receive an indicator of a memory page which content, or part of the content, is being currently accessed further includes to receive an indicator of a memory page resulting from a page walk due to a miss in response to a request to fetch an address mapping from a translation lookaside buffer (TLB).

Example 10 may include the apparatus of example 9, wherein the TLB is an instruction TLB (ITLB) and the request to fetch the address mapping from the TLB is due to a request to fetch an instruction within the memory page; and further comprising, to cause a data TLB (DTLB) to invalidate all entries with write permission of the DTLB for the indicated memory page such that a subsequent request to write to the memory page will cause a miss response for the address mapping from the DTLB and cause the indicated memory page to be marked as dirty.

Example 11 may include the apparatus of example 10, further comprising upon a write to a memory page that has execute permission is to: cause a DTLB entry to be created with a dirty bit set; and cause any associated entry in the ITLB to be invalidated to prevent subsequent execution of the memory page.

Example 12 may include the apparatus of example 11, wherein a write to a memory page that has execute permission is further to: create an entry in the DTLB for the memory page; and invalidate matching ITLB entries for all logical processors.

Example 13 may include the apparatus of example 10, further comprising, upon a request to fetch an instruction, to: create an entry in the ITLB for the memory page; cause the DTLB to invalidate all entries for that memory page; and invalidate matching DTLB entries for all logical processors.

Example 14 may include the apparatus of any one of examples 1-8, wherein the VFM is implemented at least in part in software.

Example 15 may include the apparatus of any one of examples 1-8, wherein the VFM is implemented at least in part in a hardware accelerator.

Example 16 may be a method, comprising: receiving an indicator of a memory page which content, or part of the content, is being currently accessed; determining whether the indicator indicates the memory page has been updated prior to the current access, after the memory page was last checked; preventing access to the memory page, until the indicator that the memory page has been updated has been cleared; verifying integrity of the content of the memory page, in response to a result of the determination indicating the memory page has been updated prior to the current access after the memory page was last checked; and allowing or disallowing access to the content, based at least in part on a result of the integrity verification.

Example 17 may include the method of example 16, wherein determining whether the indicator indicates the memory page has been updated prior to the current access further includes determining whether a dirty bit has been set in the memory page.

Example 18 may include the method of example 16, wherein verifying integrity of the content of the memory page further includes: invoking an exception handler to report that a memory page indicated as dirty has been accessed for instruction execution; performing exception handling to confirm that the content of the memory page is valid; or modifying the memory page content so that the modified memory page content is valid.

Example 19 may include the method of example 18, wherein performing exception handling further includes generating a restartable exception to transfer execution control to an exception handler.

Example 20 may include the method of example 19, wherein generating an interrupt further includes causing security attribute checking code to be executed to confirm that the memory page content is valid.

Example 21 may include the method of any one of examples 16-20, wherein receiving the indicator of a memory page which content, or part of the content, is being currently accessed further includes receiving the indicator of a memory page resulting from a page walk due to a miss in response to a request to fetch an address mapping from a translation lookaside buffer (TLB).

Example 22 may include the method of example 21, wherein the TLB is an instruction TLB (ITLB) and the TLB request to fetch an address mapping from the TLB is due to a request to fetch an instruction within the memory page; and further comprising: causing a data TLB (DTLB) to invalidate all entries with write permission of the DTLB for the memory page such that a subsequent request to write to the memory page will cause a miss response for the address mapping from the DTLB; and causing the memory page to be marked as dirty.

Example 23 may include the method of example 22, further comprising upon a write to a memory page that has execute permission: causing a DTLB entry to be created with a dirty bit set; and causing an associated entry in the ITLB to be invalidated to prevent subsequent execution of the memory page.

Example 24 may include the method of example 23, further comprising upon a write to a memory page that has execute permission: creating an entry in the DTLB for the memory page; and invalidating matching ITLB entries for all logical processors.

Example 25 may include the method of example 22, further comprising upon a request to fetch an instruction: creating an entry in the ITLB for the memory page; causing the DTLB to invalidate all entries for that memory page; and invalidating matching DTLB entries for all logical processors.

Example 26 may include the method of any one of examples 16-20, wherein the method is implemented at least in part in software.

Example 27 may include the method of any one of examples 16-20, wherein the method is implemented at least in part in a hardware accelerator.

Example 28 may be a system comprising: one or more processors; a memory coupled to the one or more processors; a verification manager (VFM) communicatively coupled to the one or more processors, wherein the VFM is to: receive an indicator of a memory page which content, or part of the content, is being currently accessed; determine whether the indicator indicates the memory page has been updated prior to the current access, after the memory page was last checked; prevent access to the memory page, until the indicator that the memory page has been updated has been cleared; verify integrity of the content of the memory page, in response to a result of the determination indicating the memory page has been updated prior to the current access, after the memory page was last checked; allow or disallow access to the content, based at least in part on a result of the integrity verification.

Example 29 may include the system of example 28, wherein has been cleared further includes has been cleared by privileged software or hardware.

Example 30 may include the system of example 28, wherein to determine whether the indicator indicates the memory page has been updated prior to the current access further includes to determine whether a dirty bit associated with the memory page has been set.

Example 31 may include the system of example 28, wherein to verify integrity of the content of the memory page further includes to: invoke an exception handler to report that a memory page indicated as dirty was being accessed for instruction execution; confirm that the content of the memory page is valid; or modify the memory page content so that the modified memory page content is valid.

Example 32 may include the system of example 31, wherein to invoke an exception handler further includes to generate a restartable exception to transfer execution control to the exception handler.

Example 33 may include the system of example 32, wherein the exception handler is executed in privileged software or hardware.

Example 34 may include the system of example 31, wherein the exception handler is to execute security attribute checking code to confirm that the memory page content is valid.

Example 35 may include the system of example 34, wherein security attribute checking code includes antivirus code.

Example 36 may include the system of any examples 28-35, further comprising a translation lookaside buffer (TLB) coupled to the memory; and wherein to receive an indicator of a memory page which content, or part of the content, is being currently accessed further includes to receive an indicator of a memory page resulting from a page walk due to a miss in response to a request to fetch an address mapping from the TLB.

Example 37 may include the system of example 36, wherein the TLB is an instruction TLB (ITLB) and the request to fetch the address mapping from the TLB is due to a request to fetch an instruction within the memory page; and further comprising, to cause a data TLB (DTLB) to invalidate all entries with write permission of the DTLB for the indicated memory page such that a subsequent request to write to the memory page will cause a miss response for the address mapping from the DTLB and cause the indicated memory page to be marked as dirty.

Example 38 may include the system of example 37, further comprising upon a write to a memory page that has execute permission is to: cause a DTLB entry to be created with a dirty bit set; and cause any associated entry in the ITLB to be invalidated to prevent subsequent execution of the memory page.

Example 39 may include the system of example 38, wherein a write to a memory page that has execute permission is further to: create an entry in the DTLB for the memory page; and invalidate matching ITLB entries for all logical processors.

Example 40 may include the system of example 37, further comprising, upon a request to fetch an instruction, to: create an entry in the ITLB for the memory page; cause the DTLB to invalidate all entries for that memory page; and invalidate matching DTLB entries for all logical processors.

Example 41 may include the system of any one of examples 28-35, wherein the VFM is implemented at least in part in software.

Example 42 may include the system of any one of examples 28-35, wherein the VFM is implemented at least in part in a hardware accelerator.

Example 43 may be one or more computer-readable media comprising instructions that cause a computing device, in response to execution of the instructions by the computing device, to: receive an indicator of a memory page which content, or part of the content, is being currently accessed; determine whether the indicator indicates the memory page has been updated prior to the current access, after the memory page was last checked; prevent access to the memory page, until the indicator that the memory page has been updated has been cleared; verify integrity of the content of the memory page, in response to a result of the determination indicating the memory page has been updated prior to the current access after the memory page was last checked; and allow or disallow access to the content, based at least in part on a result of the integrity verification.

Example 44 may include the computer-readable media of example 43, wherein determining whether the indicator indicates the memory page has been updated prior to the current access further includes determining whether a dirty bit has been set in the memory page.

Example 45 may include the computer-readable media of example 43, wherein verifying integrity of the content of the memory page further includes: invoke an exception handler to report that a memory page indicated as dirty has been accessed for instruction execution; perform exception handling to confirm that the content of the memory page is valid; or modify the memory page content so that the modified memory page content is valid.

Example 46 may include the computer-readable media of example 45, wherein perform exception handling further includes generate a restartable exception to transfer execution control to an exception handler.

Example 47 may include the computer-readable media of example 46, wherein generate an interrupt further includes cause security attribute checking code to be executed to confirm that the memory page content is valid.

Example 48 may include the computer-readable media of any one of examples 43-47, wherein receive the indicator of a memory page which content, or part of the content, is being currently accessed further includes receive the indicator of a memory page resulting from a page walk due to a miss in response to a request to fetch an address mapping from a translation lookaside buffer (TLB).

Example 49 may include the computer-readable media of example 48, wherein the TLB is an instruction TLB (ITLB) and the TLB request to fetch an address mapping from the TLB is due to a request to fetch an instruction within the memory page; and further comprising: causing a data TLB (DTLB) to invalidate all entries with write permission of the DTLB for the memory page such that a subsequent request to write to the memory page will cause a miss response for the address mapping from the DTLB; and causing the memory page to be marked as dirty.

Example 50 may include the computer-readable media of example 49, further comprising upon a write to a memory page that has execute permission: cause a DTLB entry to be created with a dirty bit set; and cause an associated entry in the ITLB to be invalidated to prevent subsequent execution of the memory page.

Example 51 may include the computer-readable media of example 50, further comprising upon a write to a memory page that has execute permission: create an entry in the DTLB for the memory page; and invalidate matching ITLB entries for all logical processors.

Example 52 may include the computer-readable media of example 49, further comprising upon a request to fetch an instruction: create an entry in the ITLB for the memory page; cause the DTLB to invalidate all entries for that memory page; and invalidate matching DTLB entries for all logical processors.

Example 53 may include the computer-readable media of any one of examples 43-47, wherein the computer-readable media is to be executed at least in part in software.

Example 54 may include the computer-readable media of any one of examples 43-47, wherein the computer-readable media is to be executed at least in part in a hardware accelerator.

Example 55 may be an apparatus, comprising: means for receiving an indicator of a memory page which content, or part of the content, is being currently accessed; means for determining whether the indicator indicates the memory page has been updated prior to the current access, after the memory page was last checked; means for preventing access to the memory page, until the indicator that the memory page has been updated has been cleared; means for verifying integrity of the content of the memory page, in response to a result of the determination indicating the memory page has been updated prior to the current access after the memory page was last checked; and means for allowing or disallowing access to the content, based at least in part on a result of the integrity verification.

Example 56 may include the apparatus of example 55, wherein means for determining whether the indicator indicates the memory page has been updated prior to the current access further includes means for determining whether a dirty bit has been set in the memory page.

Example 57 may include the process of example 55, wherein means for verifying integrity of the content of the memory page further includes: means for invoking an exception handler to report that a memory page indicated as dirty has been accessed for instruction execution; means for performing exception handling to confirm that the content of the memory page is valid; or means for modifying the memory page content so that the modified memory page content is valid.

Example 58 may include the apparatus of example 57, wherein means for performing exception handling further includes means for generating a restartable exception to transfer execution control to an exception handler.

Example 59 may include the apparatus of example 58, wherein means for generating an interrupt further includes means for causing security attribute checking code to be executed to confirm that the memory page content is valid.

Example 60 may include the apparatus of any one of examples 55-59, wherein means for receiving the indicator of a memory page which content, or part of the content, is being currently accessed further includes means for receiving the indicator of a memory page resulting from a page walk due to a miss in response to a request to fetch an address mapping from a translation lookaside buffer (TLB).

Example 61 may include the apparatus of example 60, wherein the TLB is an instruction TLB (ITLB) and the TLB request to fetch an address mapping from the TLB is due to a request to fetch an instruction within the memory page; and further comprising: means for causing a data TLB (DTLB) to invalidate all entries with write permission of the DTLB for the memory page such that a subsequent request to write to the memory page will cause a miss response for the address mapping from the DTLB; and means for causing the memory page to be marked as dirty.

Example 62 may include the apparatus of example 61, further comprising upon a write to a memory page that has execute permission: means for causing a DTLB entry to be created with a dirty bit set; and means for causing an associated entry in the ITLB to be invalidated to prevent subsequent execution of the memory page.

Example 63 may include the apparatus of example 62, further comprising upon a write to a memory page that has execute permission: means for creating an entry in the DTLB for the memory page; and means for invalidating matching ITLB entries for all logical processors.

Example 64 may include the apparatus of example 61, further comprising upon a request to fetch an instruction: means for creating an entry in the ITLB for the memory page; means for causing the DTLB to invalidate all entries for that memory page; and means for invalidating matching DTLB entries for all logical processors.

What is claimed is:

1. An apparatus for computing, comprising:
one or more processors;
a verification manager (VFM) coupled with the one or more processors, wherein the VFM is to:
receive an indicator of a memory page which content, or part of the content, is being currently accessed, wherein the indicator is based on an entry in a page table, resulting from a page walk due to a miss in response to a request to fetch an address mapping from an instruction translation lookaside buffer (ITLB) in response to a request to fetch an instruction within the memory page, that includes a virtual address to a physical address translation and a corresponding dirty bit associated with the memory page;
determine whether the indicator indicates the memory page has been updated prior to the current access, after the memory page was last checked;
prevent access to the memory page, until the indicator that the memory page has been updated has been cleared;
verify integrity of the content of the memory page, in response to a result of the determination indicating the memory page has been updated prior to the current access, after the memory page was last checked;
allow or disallow access to the content, based at least in part on a result of the integrity verification.

2. The apparatus of claim 1, wherein has been cleared further includes has been cleared by privileged software or hardware.

3. The apparatus of claim 1, wherein to determine whether the indicator indicates the memory page has been updated prior to the current access further includes to determine whether the dirty bit associated with the memory page has been set.

4. The apparatus of claim 1, wherein to verify integrity of the content of the memory page further includes to:
invoke an exception handler to report that a memory page indicated as dirty was being accessed for instruction execution;
confirm that the content of the memory page is valid; or
modify the memory page content so that the modified memory page content is valid.

5. The apparatus of claim 4, wherein to invoke an exception handler further includes to generate a restartable exception to transfer execution control to the exception handler.

6. The apparatus of claim 5, wherein the exception handler is executed in privileged software or hardware.

7. The apparatus of claim 4, wherein the exception handler is to execute security attribute checking code to confirm that the memory page content is valid.

8. The apparatus of claim 7, wherein security attribute checking code includes antivirus code.

9. The apparatus of claim 1,
further comprising, to cause a data TLB (DTLB) to invalidate all entries with write permission of the DTLB for the indicated memory page such that a subsequent request to write to the memory page will cause a miss response for the address mapping from the DTLB and cause the indicated memory page to be marked as dirty.

10. The apparatus of claim 9, further comprising upon a write to a memory page that has execute permission is to:
cause a DTLB entry to be created with a dirty bit set; and
cause any associated entry in the ITLB to be invalidated to prevent subsequent execution of the memory page.

11. The apparatus of claim 10, wherein a write to a memory page that has execute permission is further to:
create an entry in the DTLB for the memory page; and
invalidate matching ITLB entries for all logical processors.

12. The apparatus of claim 9, further comprising, upon a request to fetch an instruction, to:
create an entry in the ITLB for the memory page;
cause the DTLB to invalidate all entries for that memory page; and
invalidate matching DTLB entries for all logical processors.

13. A method, comprising:
receiving an indicator of a memory page which content, or part of the content, is being currently accessed, wherein the indicator is based on an entry in a page table, resulting from a page walk due to a miss in response to a request to fetch an address mapping from an instruction translation lookaside buffer (ITLB) in response to a request to fetch an instruction within the memory page, that includes a virtual address to a physical address translation and a corresponding dirty bit associated with the memory page;

determining whether the indicator indicates the memory page has been updated prior to the current access, after the memory page was last checked;

preventing access to the memory page, until the indicator that the memory page has been updated has been cleared;

verifying integrity of the content of the memory page, in response to a result of the determination indicating the memory page has been updated prior to the current access after the memory page was last checked; and allowing or disallowing access to the content, based at least in part on a result of the integrity verification.

14. The method of claim 13, wherein determining whether the indicator indicates the memory page has been updated prior to the current access further includes determining whether the dirty bit has been set in the memory page.

15. The method of claim 13, wherein verifying integrity of the content of the memory page further includes:

invoking an exception handler to report that a memory page indicated as dirty has been accessed for instruction execution;

performing exception handling to confirm that the content of the memory page is valid; or modifying the memory page content so that the modified memory page content is valid.

16. The method of claim 15, wherein performing exception handling further includes generating a restartable exception to transfer execution control to an exception handler.

17. The method of claim 16, wherein generating an interrupt further includes causing security attribute checking code to be executed to confirm that the memory page content is valid.

18. A system comprising:
one or more processors;
a memory coupled to the one or more processors;
a verification manager (VFM) communicatively coupled to the one or more processors, wherein the VFM is to:
receive an indicator of a memory page which content, or part of the content, is being currently accessed, wherein the indicator is based on an entry in a page table, resulting from a page walk due to a miss in response to a request to fetch an address mapping from an instruction translation lookaside buffer (ITLB) in response to a request to fetch an instruction within the memory page, that includes a virtual address to a physical address translation and a corresponding dirty bit associated with the memory page;
determine whether the indicator indicates the memory page has been updated prior to the current access, after the memory page was last checked;
prevent access to the memory page, until the indicator that the memory page has been updated has been cleared;
verify integrity of the content of the memory page, in response to a result of the determination indicating the memory page has been updated prior to the current access, after the memory page was last checked;
allow or disallow access to the content, based at least in part on a result of the integrity verification.

19. The system of claim 18, wherein has been cleared further includes has been cleared by privileged software or hardware.

20. One or more non-transitory computer-readable media comprising instructions that cause a computing device, in response to execution of the instructions by the computing device, to:
receive an indicator of a memory page which content, or part of the content, is being currently accessed, wherein the indicator is based on an entry in a page table, resulting from a page walk due to a miss in response to a request to fetch an address mapping from an instruction translation lookaside buffer (ITLB) in response to a request to fetch an instruction within the memory page, that includes a virtual address to a physical address translation and a corresponding dirty bit associated with the memory page;
determine whether the indicator indicates the memory page has been updated prior to the current access, after the memory page was last checked;
prevent access to the memory page, until the indicator that the memory page has been updated has been cleared;
verify integrity of the content of the memory page, in response to a result of the determination indicating the memory page has been updated prior to the current access after the memory page was last checked; and
allow or disallow access to the content, based at least in part on a result of the integrity verification.

21. The non-transitory computer-readable media of claim 20, wherein determining whether the indicator indicates the memory page has been updated prior to the current access further includes determining whether the dirty bit has been set in the memory page.

22. The non-transitory computer-readable media of claim 20, wherein verifying integrity of the content of the memory page further includes:
invoke an exception handler to report that a memory page indicated as dirty has been accessed for instruction execution;
perform exception handling to confirm that the content of the memory page is valid; or
modify the memory page content so that the modified memory page content is valid.

23. The non-transitory computer-readable media of claim 22, wherein perform exception handling further includes generate a restartable exception to transfer execution control to an exception handler.

* * * * *